US010326685B1

(12) United States Patent
Whittaker

(10) Patent No.: US 10,326,685 B1
(45) Date of Patent: Jun. 18, 2019

(54) VIRTUAL ROUTING TABLES FOR ROUTERS IN A MULTI-TIER NETWORK

(71) Applicant: Amazon Technologies, Inc., Seattle, WA (US)

(72) Inventor: Colin John Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/275,126

(22) Filed: Sep. 23, 2016

Related U.S. Application Data

(60) Provisional application No. 62/368,791, filed on Jul. 29, 2016.

(51) Int. Cl.
*H04L 12/751* (2013.01)
*H04L 12/721* (2013.01)

(52) U.S. Cl.
CPC .............. *H04L 45/02* (2013.01); *H04L 45/26* (2013.01); *H04L 45/72* (2013.01)

(58) Field of Classification Search
None
See application file for complete search history.

(56) References Cited

U.S. PATENT DOCUMENTS

| | | | | |
|---|---|---|---|---|
| 7,334,047 | B1* | 2/2008 | Pillay-Esnault | H04L 45/02 709/239 |
| 2004/0136371 | A1* | 7/2004 | Muralidhar | H04L 45/02 370/389 |
| 2005/0152333 | A1* | 7/2005 | Smith | H04L 45/02 370/351 |
| 2009/0041037 | A1* | 2/2009 | Yang | H04L 45/02 370/401 |
| 2010/0054153 | A1* | 3/2010 | White | H04L 45/02 370/254 |
| 2015/0312134 | A1* | 10/2015 | Kapadia | H04L 45/02 370/256 |
| 2016/0134531 | A1* | 5/2016 | Assarpour | H04L 45/74 370/392 |
| 2017/0063633 | A1* | 3/2017 | Goliya | H04L 41/12 |

* cited by examiner

*Primary Examiner* — Otis L Thompson, Jr.
(74) *Attorney, Agent, or Firm* — Klarquist Sparkman, LLP

(57) ABSTRACT

Technologies are provided for creating virtual routing tables in routers in a multi-tier network. One or more routers in the network are configured to block other routers in a lower tier of the network from receiving routing updates from one another. By blocking the routing updates, the routers in the higher tier of the network cause the routers in the lower tier of the network to create different virtual routing tables that do not include other routers the lower tier of the network. In such a configuration, routers in the lower tier of the network can be connected to routers in the higher tier of the network with partially overlapping uplink connections without a loss of bandwidth utilization. Since the routers in the lower tier of the network are unaware of the partially overlapping uplink connections, the routers in the lower tier of the network can distribute data transmissions to one another evenly across all their uplink connections to the routers in the higher tier of the network, instead of using the overlapping uplink connections exclusively.

20 Claims, 11 Drawing Sheets

FIG. 6

```
                            604
602⎯ip prefix-list T1-T2-ROUTERS
           description Router IDs of T1 and T2 routers
606⎯ip prefix-list T1-T2-ROUTERS seq 1 permit 10.0.0.1/32
608⎯ip prefix-list T1-T2-ROUTERS seq 2 permit 10.0.0.2/32
       ...
610⎯ip prefix-list T1-T2-ROUTERS seq N permit 10.0.0.N/32
612⎯ip prefix-list T1-T2-ROUTERS seq 1000 deny any
       !                     615
614⎯ip prefix-list DENY-ALL deny any
       !
616⎯interface jrp1
           description 'tor 1'
           ...
    618⎯ip ospf type-1-lsa-filter-out T1-T2-ROUTERS
    620⎯ip ospf type-3-lsa-filter-out DENY-ALL
```

VIRTUAL ROUTING TABLES FOR ROUTERS IN A MULTI-TIER NETWORK

CROSS REFERENCE TO RELATED APPLICATION

This application claims the benefit of U.S. Provisional Application Ser. No. 62/368,791, entitled VIRTUAL ROUTING TABLES FOR ROUTERS IN A MULTI-TIER NETWORK, filed on Jul. 29, 2016, which is incorporated by reference herein in its entirety.

BACKGROUND

Data centers can use multi-tier network fabrics that comprise rack aggregation devices that are made up of multiple routers and support uplinks from a lower level of routers, such as multiple top-of-rack (TOR) routers. Due to the nature of at least some routing protocols (such as open shortest path first (OSPF)) that are used to route traffic between lower level routers connected to a rack aggregation device, and the routers within a rack aggregation device, limitations are often placed on the number of uplinks that any lower level router can have to routers within the rack aggregation device. These placement limitations dictate a set of acceptable uplink combinations that ensure that any two lower level routers connected to a rack aggregation device either completely overlap in the routers to which they are connected, or do not overlap at all. Such placement restrictions avoid partial connection overlaps between lower level routers connected to a rack aggregation device, but can lead to underutilization of the rack aggregation device's uplink capacity.

Therefore, there exists ample opportunity for improvement in technologies related to the routing of communications between lower level routers, such as TOR routers, connected to rack aggregation devices.

BRIEF DESCRIPTION OF THE DRAWINGS

FIG. 6 is a diagram depicting another example configuration for filtering link state updates transmitted to TOR routers.

DETAILED DESCRIPTION

Due to the nature of the routing protocols (such as open shortest path first (OSPF)) used to route traffic between routers in a multi-tier computer network (such as leaf nodes in a Clos network and/or top-of-rack (TOR) routers connected to a rack aggregation device), and the routers within the multi-tier network, limitations are placed on the number of uplinks that any router can have to routers in a higher tier of the multi-tier network. These placement limitations dictate a set of acceptable uplink combinations that ensure that any two lower-tier routers connected to the network either completely overlap in the routers in a higher tier of the network to which they are connected, or do not over lap at all. Such placement restrictions were necessary because local routing protocols (e.g., OSPF) typically choose a shortest path between two routers for communications between the routers. If a partial overlap exists between two routers (i.e., the routers are connected to some, but not all, of the same routers in a higher tier of the network), the routing protocol will only use the partial capacity associated with the overlapping connections for communications between the two routers.

Such strict placement rules can ensure that full bi-sectional bandwidth is available between any two routers on the same network. However, as router uplink density increases (e.g., as a given TOR router is directly connected to an increasing number of higher-level routers), such placement restrictions can impose a cost burden on rack designs because additional routers are needed to align with the supported uplink combinations.

The technologies described herein can be used to enable arbitrary numbers of router uplinks while still ensuring full bi-sectional bandwidth between routers in a same tier of a multi-tier network without any modification to the hardware or software of the routers. Network topology information provided to the routers in the same tier is filtered so that the routers are unaware of where partial overlaps exist. By filtering the network topology information that is transmitted to the routers, each router can be made to construct an alternative view (or "description") of the network topology. The alternative view can be, for example, an alternative or virtual routing table and/or an alternative or virtual link state database (LSDB).

Figure 1:
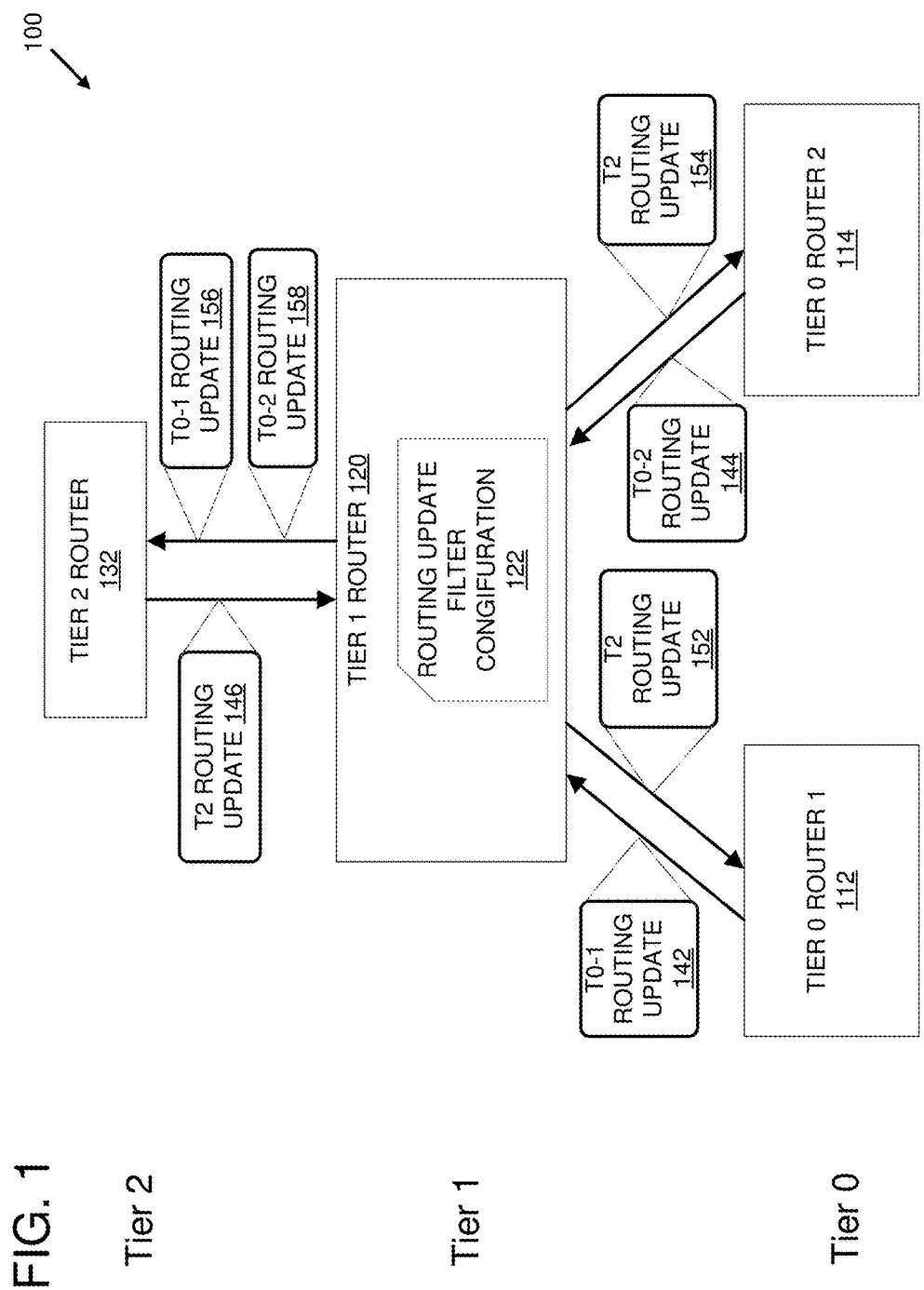
FIG. 1 is a system diagram depicting an example system for filtering routing updates in a multi-tier network using a routing update configuration.

FIG. 1 is a system diagram depicting an example system 100 for filtering routing updates in a multi-tier network using a routing update configuration 122. A tier 1 router 120 comprises the routing update configuration 122 and is configured to receive routing updates (e.g., 142 and 144) from tier zero routers 112 and 114. The tier 1 router 120 is further configured to receive routing updates (e.g., 146) from one or more tier 2 routers (e.g., 132). The tier 1 router 120 evaluates received routing updates (e.g. 142, 144, 146) using the routing update filter configuration 122 in order to identify other routers (e.g. tier 0 routers 112 and 114, and tier 2 router 132) to which the tier 1 router 120 should transmit the received routing updates.

In at least one embodiment, the tier 0 routers 112 and 114 are top-of-rack routers connected to downlink interfaces of the tier 1 router 120.

In at least one embodiment, the routing update filter configuration 122 specifies one or more source routers from which routing updates should be blocked. In a different or further embodiment, the routing update filter configuration 122 specifies one or more destination routers to which filtering rules and/or criteria specified in the routing update filter configuration 122 should be applied. For example, in FIG. 1 the routing update filter configuration 122 causes the tier 1 router 122 to block routing updates originating from the tier 0 routers 112 and 114 from being received by one another. However, the routing update filter configuration 122 causes the tier 1 router 120 to allow the routing update 146 to be transmitted by the tier 1 router 120 to the tier 0 routers 112 and 114.

In the scenario depicted by the routing update messages 142-158 in FIG. 1, the routing updates 142 and 144 are transmitted to the tier 1 router 120 by the tier 0 routers 112 and 114, respectively. The tier 1 router 120 evaluates the received routing update 142 using the routing update filter configuration 122 and determines that the routing update 142, originating from the tier 0 router 112, should not be transmitted to the tier 0 router 114 but can be transmitted to the tier 2 router 132. Similarly, the tier 1 router 120 evaluates the received routing update 144, originating from the tier 0 router 114, using the routing update filter configuration 122 and determines that the routing update 144 should not be transmitted to the tier 0 router 112, but can be transmitted to the tier 2 router 132. The tier 1 router 120 then transmits routing updates 156 and 158 to the tier 2 router 132 and prevents routing updates from being transmitted to the tier 0 routers 112 and 114.

The tier 1 router 120 also receives the routing update 146 from the tier 2 router 132 and, using the routing update filter configuration 122, determines that the routing update 146 can be transmitted to the tier 0 routers 112 and 114. The tier 1 router 120 then transmits a routing update 152 to the tier 0 router 112 and transmits a routing update 154 to the tier 0 router 114.

The routing updates 142-158 can comprise information about network connections between the routers in the multi-tier network 100. The routers in the multi-tier network (e.g., 112, 114, 122, and 132) can be configured to update internal network topologies and/or routing tables based on received routing updates. By preventing routing updates originating from tier 0 routers (e.g. 142 and 144) from being received by other tier 0 routers (e.g. 112 and 114), the tier 1 router 120 can cause the tier 0 routers 112 and 114 to generate partial or incomplete network topologies and/or routing tables.

In at least one embodiment, the routing updates 142-158 comprise link state update messages, such as link state advertisement (LSA) packets. In such an embodiment, the routing update filter configuration 122 can be processed by the tier 1 router 120 to generate an LSA filter that identifies routers in the multi-tier network from which LSA packets are allowed. For example, the tier 1 router 120 can determine, using the LSA filter, that the tier 0 router 112 is not a router from which LSA packets are allowed to be transmitted. The determining can comprise identifying a source address of the tier 0 router 112 in the received LSA packet and determining that the source address of the tier 0 router 112 is not included in a list of authorized addresses defined in the LSA filter. Responsive to such a determining, the tier 1 router 120 can block LSA packets received from the tier 0 router 112 from being transmitted to the tier 0 router 114.

In a different or further embodiment, the generated LSA filter can be associated with one or more downlink interfaces of the tier 1 router 120 to which the tier 0 router 114 is connected.

Figure 2:
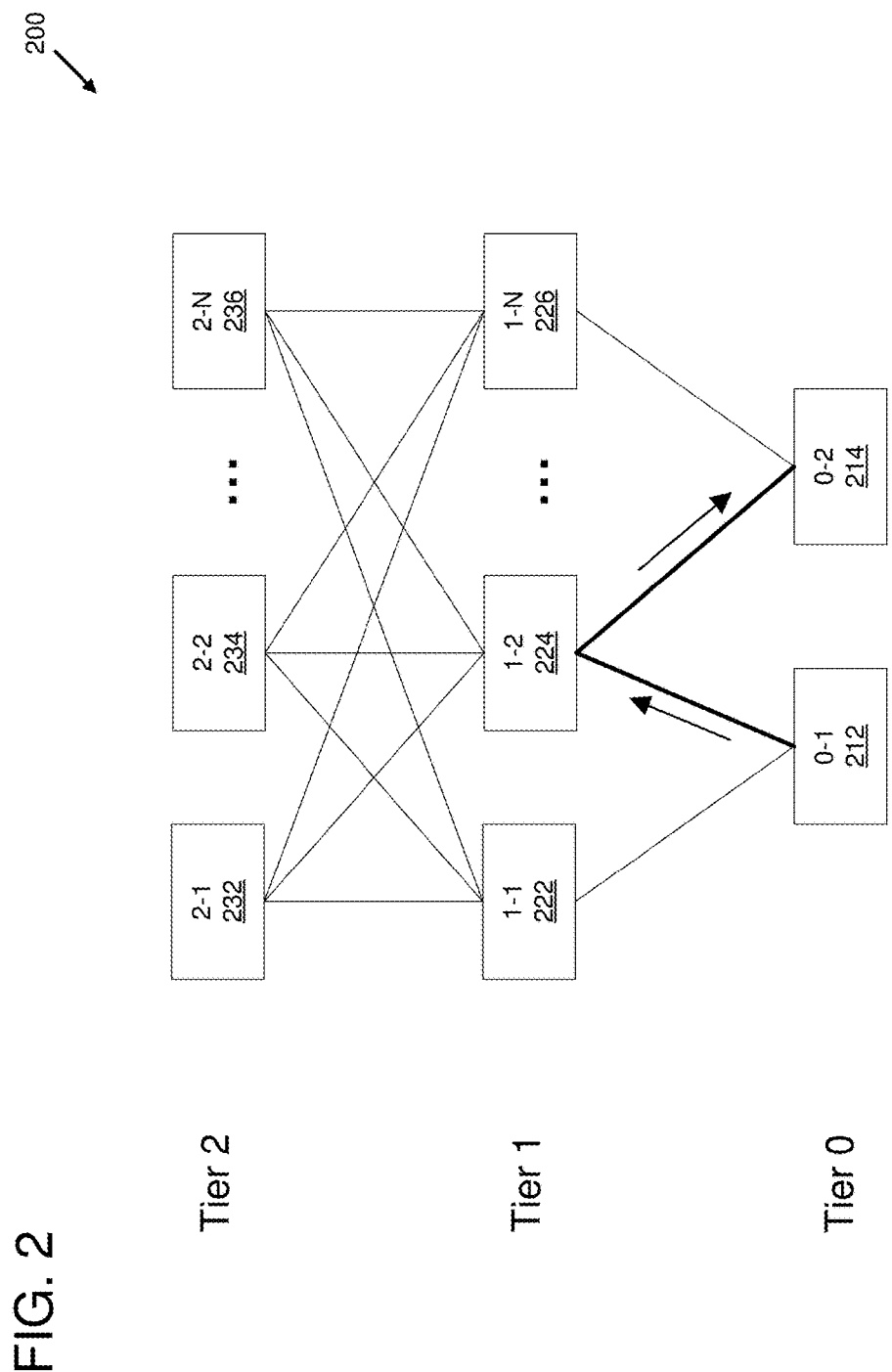
FIG. 2 is a system diagram depicting an example system comprising partially overlapping routers configured to communicate with each other exclusively through overlapping connections.

FIG. 2 is a system diagram depicting an example system 200 comprising N tier 2 (T2) routers 232-236 connected to N tier 1 (T1) routers 222-226 by a uniform mesh and two tier 0 (T0) routers 212 and 214 connected to the T1 routers in a partially overlapping configuration. For example, the T0 router 212 is connected to the T1 router 222 and the T1 router 224, while the T0 router 214 is connected to the T1 router 224 and the T1 router 226. The T0 routers 212 and 214 have partially overlapping connections because they are both connected to the T1 router 224 and are each also connected to other, different T1 routers.

In any of the example multi-tier networks described herein, the tiers can be described as "lower" and "higher" (or "upper") tiers. For example, a tier 0 could be described as a lower tier, and tier 1 and tier 2 could be described as higher tiers, relative to tier 0. A lower tier can be a tier of routers that are relatively closer to server racks containing source and/or destination servers in a multi-tier network, while a higher tier can be a tier of routers that are relatively farther away from the server racks. In this sense, the terms closer and farther away can refer to a number of intervening routers between a router and the server racks, rather than geographic distance. In at least some embodiments, a tier 0 router (such as the T0 routers 112 and 114 depicted in FIG. 1 or the T0 routers 212 and 214 depicted in FIG. 2) can be a TOR router connected to a server rack. For example, T0 routers 212 and 214 can be TOR routers connected to separate server racks.

Two T0 routers (212 and 214), with two connections each, are depicted for illustration purposes. Other numbers of T0 routers and/or other numbers of connections are also possible. There is also no requirement that the T0 routers have the same number of connections.

If the T0 routers 212 and 214 are aware of the shared connection to the T1 router 224, they will identify the shared connection as a shortest open path between them and use the shared connection exclusively for communication with one another. For example, FIG. 2 depicts the T0 router 212 transmitting data to the T0 router 214 using only the T1 router 224. Although this can have the advantage of transmitting packets between the T0 routers 212 and 214 using the fewest possible hops, in at least some cases it can lead to performance degradation because the T0 routers 212 and 214 are not using all of their available communication channels to transmit messages to one another.

Interior routing protocols, (OSPF, Routing Information Protocol (RIP), etc.), can have an underlying assumption that all routers in an area have identical routing tables and/or LSDBs (i.e., all routers in an area have an identical view of the local network topology). This is accomplished by the routers in the area transmitting routing updates to each other. The routing updates can be link state update messages (e.g., LSA packets), route advertisements, route messages, etc. In a configuration where a router (e.g., the T1 router 224) is connected to multiple T0 routers (e.g., the T0 routers 212 and 214), the router can break this assumption by blocking at least some of the routing updates transmitted by at least some of the T0 routers from being received by at least some of the other T0 routers. In a particular embodiment, the router can block type 3 LSA packets and/or type 1 LSA packets transmitted by the T0 routers from being received by other T0 routers.

Such a blocking or filtering can create a different "virtual" routing table and/or LSDB on each of the T0 routers. Based on the filtered routing updates transmitted to the T0 routers, each T0 router can be prevented from knowing that the other T0 routers are in a network area. For example, a T0 router can be made to construct an LSDB that causes the T0 router to act as if it were the only edge node connected to the T1 router. In this way, the T0 routers that partially overlap will not detect the partially overlapping connections as shortest open paths between one another and will use all of their connections to the T1 routers to communicate with one another.

A routing table and/or LSDB stores information about connections between routers in a network. The routing table and/or LSDB can be used by a router to determine routes for transmitting data messages in the network. Routing updates can contain information describing connections between the routers in the network. When a router receives a routing update, it can update its routing table and/or LSDB based on the connection information in the routing update. In at least some embodiments, a routing table and/or LSDB can be referred to as a network topology description since it contains information describing the connections between the routers (i.e., the topology) in the network.

Figure 3:
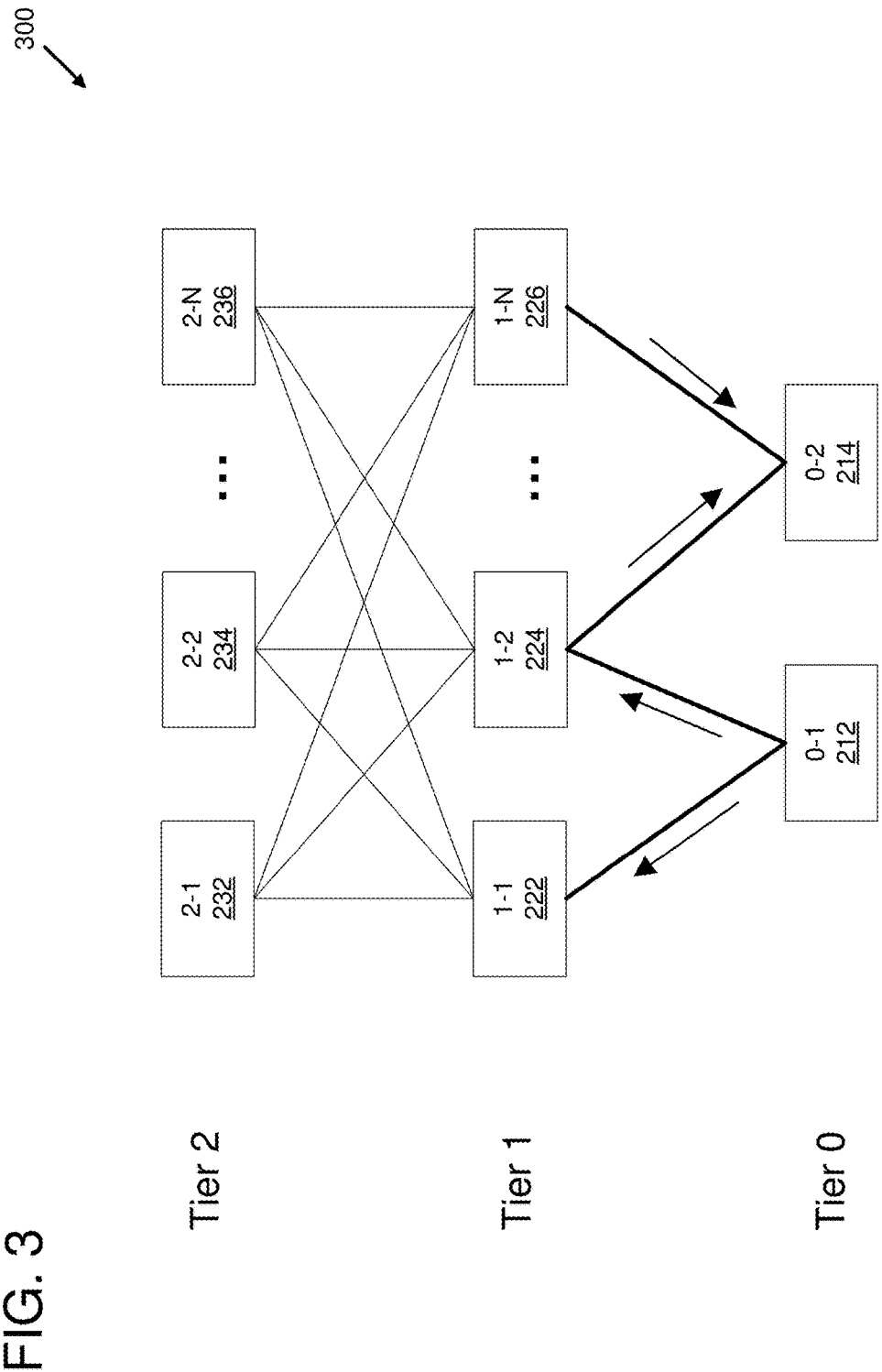
FIG. 3 is a system diagram showing an example system comprising partially overlapping routers configured to communicate with each other through overlapping and non-overlapping connections.

FIG. 3 is a system diagram depicting an example system 300 comprising partially overlapping T0 routers configured to communicate with each other through overlapping and non-overlapping connections. The T1 routers 222-226 can be configured to transmit filtered network topology updates to connected T0 routers (e.g., 212 and 214). Nodes in the network can be considered to be neighboring nodes when they are directly connected to one another. In example system 300, the T1 router 224 is connected to T2 routers 232-236 and to the T0 routers 212 and 214. The T1 router 224 can transmit filtered topology updates to the T0 routers 212 and 214 in order to keep each T0 router from being aware that the other T0 router is connected to the T1 router 224. However, the T1 router 224 can maintain a routing table and/or LSDB that accurately describes the topology of the network. In different or further embodiments, the T1 router 224 can transmit unfiltered topology updates to the T2 routers 232-236 so that the T2 routers 232-236 are aware that both the T0 routers 212 and 214 are connected to the T1 router 224.

In such an embodiment, the T0 routers 212 and 214 will not be aware of their common connection to the T1 router 224 and can transmit packets addressed to one another using all of their uplink connections instead of limiting the transmissions to the partially overlapping connection. For example, in FIG. 3, the T0 router 212 is depicted as transmitting data to the T0 router 214 using its connections to the T1 routers 222 and 224 and the T0 router 214 is depicted as receiving the transmitted data via its connections to the T1 routers 224 and 226. Transmission of data via multiple connections to multiple T1 routers can be achieved using a routing protocol that supports transmissions using multiple routes, such as equal cost multi-path (ECMP). Since the T0 routers do not detect their overlapping connections, they can regard all their uplink connections has have an equal cost and transmit data using multiple uplink connections.

In at least some embodiments, the T0 routers 212 and 214 can be TOR routers connected to separate server racks. In at least some embodiments, one or more of the routers can be replaced with switches having at least some of the same functionality as the routers.

Figure 4:
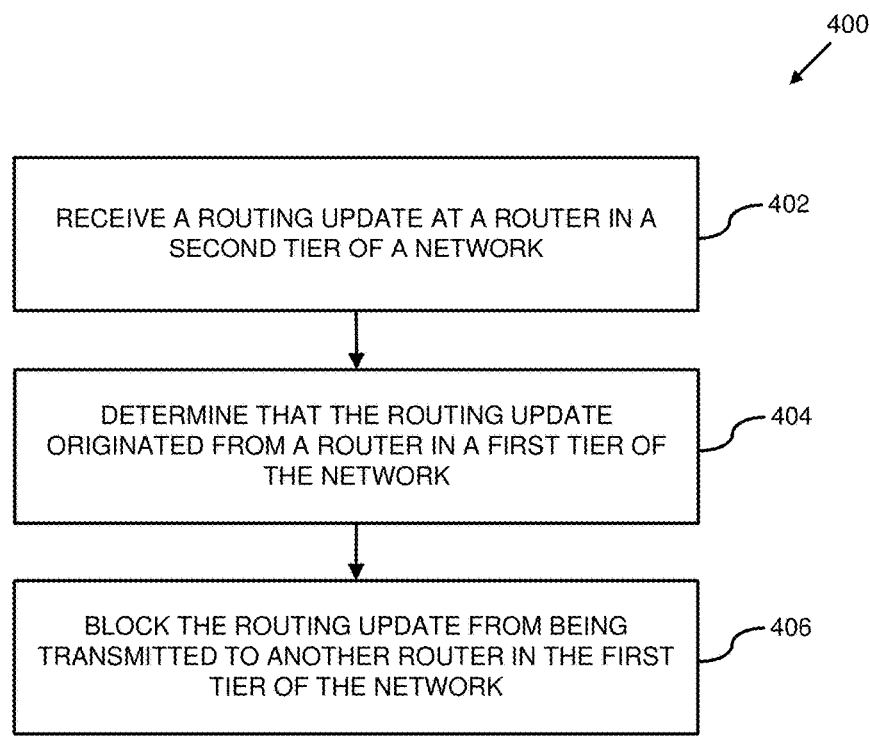
FIG. 4 is a flowchart of an example method for blocking routing updates from one router in a lower tier of a network from being transmitted to another router in the lower tier of the network.

FIG. 4 is a flowchart depicting an example method 400 for blocking routing updates from being transmitted to a router in a lower tier of a network. At 402, a routing update is received at a router in a second tier of a network comprising multiple tiers of routers. In at least one embodiment, the routing update is a link state update comprising one or more LSA packets. At 404, the router in the second tier of the network determines that the routing update originated from a router in a first tier of the network, wherein the first tier is lower in the multi-tier network than the second tier. In an embodiment where the routing update is a link state update comprising an LSA packet, the router in the second tier of the network can evaluate an "Advertising Router" field of the LSA packet to determine whether a router ID contained within the "Advertising Router" field is an ID of a router in a lower tier of the network (such as a TOR router with one or more uplink connections to the router). Alternatively, the router in the second tier of the network can compare the router ID within the "Advertising Router" field to a list of IDs of authorized routers, wherein routers in the first, lower tier of the network are excluded from the list of authorized routers. At 406, the router in the second tier of the network blocks the routing update that originated from the router in the first, lower tier of the network from being transmitted to another router in the first, lower tier of the network. Example mechanisms for performing such blocking are described in more detail below.

By filtering the routing updates transmitted to the routers in the lower tier of the network, the router in the higher tier of the network can cause the routers in the lower tier to create partial views of the network topology, such as partial routing tables and/or partial LSDBs, which do not include one another. In at least some embodiments, such filtering can be specified by a configuration that is processed by the router in the higher tier of the network.

Alternatively or additionally, the router in the higher tier of the network can generate a partial view of a network topology, for a router in the lower tier of the network that is connected to the router in the higher tier, which excludes connections to other routers in the lower tier of the network, and transmit the partial view of the network topology to the router in the lower tier of the network. The router in the higher tier of the network can, in at least some cases, generate such partial views for each router in the lower tier of the network with one or more uplink connections to the router in the higher tier.

Figure 5:
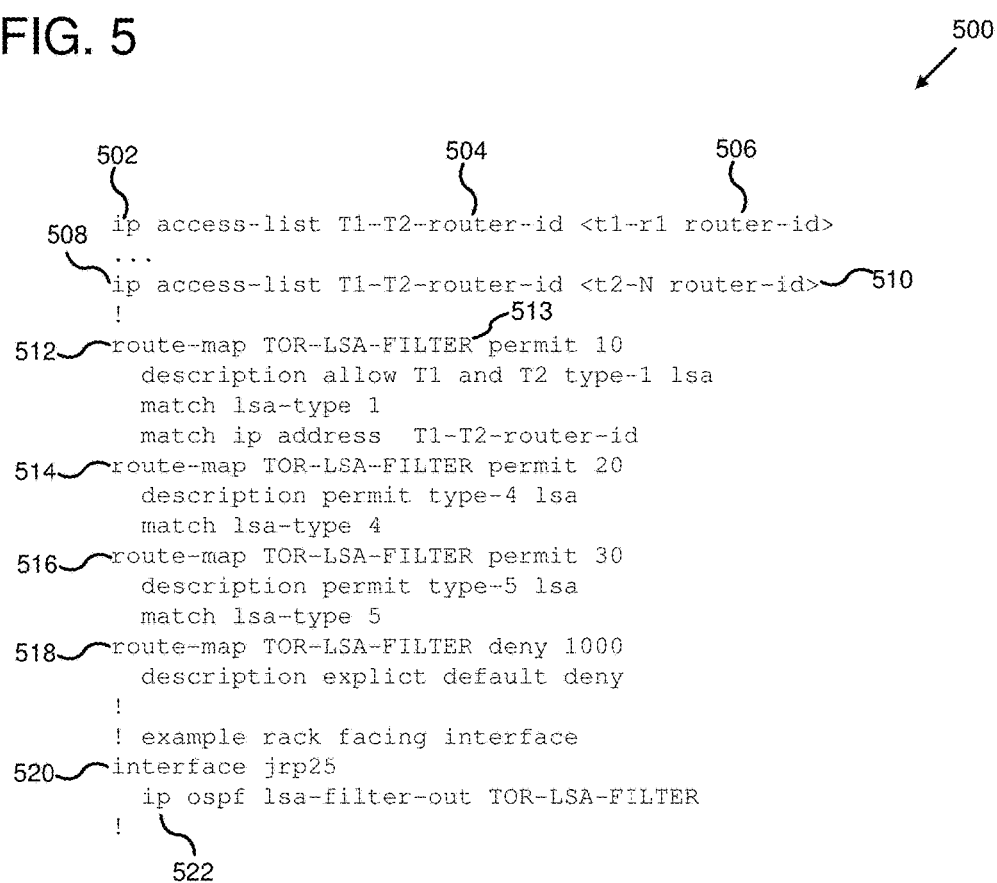
FIG. 5 is a diagram depicting an example configuration for filtering link state updates transmitted to top-of-rack (TOR) routers.

FIG. 5 depicts an example configuration 500 that, when processed by a router in a network, can configure the router to filter link state updates that are transmitted to one or more TOR routers connected to the router. IP access-list lines 502-508 define an example access list "T1-T2-router-id" 504 that specifies IDs of T1 routers and T2 routers (e.g., 506 and 510) in an example network. One or more route-map entries (e.g., 512-518) are specified using the topology of the network to create an LSA filter "TOR-LSA-FILTER" 513 that permits and/or denies different types of LSAs based on various criteria. Such criteria can include, for example: whether the LSA is from a router on an access list (e.g., for a particular level of router); a type of the LSA; whether the LSA is on a whitelist; and whether the LSA contains one or more filtered routes.

An example route-map entry 512 permits type 1 LSAs from routers identified in the example T1 and T2 router access list. An example entry 514 permits all type 4 LSAs to be transmitted. An example route-map entry 516 permits all type 5 LSAs to be transmitted. An example entry 518 denies transmission of all LSAs that have not been expressly permitted by the previous example route-map entries 512-516.

An example interface statement 520 applies the "TOR-LSA-FILTER" LSA filter 513 defined by the example route-map statements 512-518 to an example rack-facing interface jrp25.

In the example network, interface jrp25 is an interface of the T1 router that is connected to a TOR router. The ip statement 522 applies the "TOR-LSA-FILTER" LSA filter 513 to outbound LSA transmissions transmitted to the jrp25 interface. In this example, the "TOR-LSA-FILTER" LSA filter 513 is applied to communications using the OSPF protocol, although application to other protocols is also possible. Additional interface statements (not shown) can be provided to apply the "TOR-TSA-FILTER" LSA filter 513 to additional rack-facing interfaces of the T1 router that are connected to other TOR routers.

When the example configuration 500 is processed by a T1 router, the T1 router will restrict the LSA packets transmitted to the specified interfaces to those LSA packets that are expressly permitted by the example route-map statements 512-516, that is, type 4 LSA packets, type 5 LSA packets, and type 1 LSA packets originating from routers identified in the "T1-T2-router-id" access-list 504.

FIG. 6 depicts another example configuration 600 for restricting network topology updates to TOR routers. In example configuration 600, a separate filter is applied for filtering LSA packets with different LSA types. In an embodiment using example configuration 600, LSA filtering can be enabled for an interface by adding an entry for the interface for Type 1 LSAs and an entry for the interface for Type 3 LSAs. The entries for the given interface specify that the interface will be connected to a TOR router and that TOR router will have flexible uplinks. For each entry, a prefix-list is provided. The prefix-list will be applied to an "Advertising Router" field of a received LSA packet. The LSA packet will only be transmitted to the TOR router connected to the interface if the "Advertising Router" field of the LSA packet matches a router identifier in the prefix list.

For example, lines 602-612 define a "T1-T2-ROUTERS" prefix-list 604. Lines 606-610 permit transmissions from identified routers. Line 612 denies all transmissions from sources other than those identified in lines 606-610. The ip statement 618 applies the "T1-T2-ROUTERS" prefix-list 604 to an outbound type 1 LSA filter for an example interface jrp1 616 connected to a "tor 1" TOR router. Line 614 defines a "DENY-ALL" prefix-list 615 that denies all transmissions. The ip statement 620 applies the "DENY-ALL" prefix-list 615 to an outbound type 3 LSA filter for the example interface jrp1 616. After the example configuration 600 is processed by the T1 router, the T1 router will block type 1 LSA packets from being transmitted to the interface jrp1 616, except for those type 1 LSA packets with "Advertising Router" fields that match router IDs in the "T1-T2-ROUTERS" prefix-list 604. The T1 router will also block all type 3 LSA packets from being transmitted to the jrp1 616 interface, according to the "DENY-ALL" prefix-list 615.

Although a single interface statement for interface jrp1 616 is depicted, additional or alternative interface statements can be included for other interfaces of the T1 router connected to other TOR routers.

In at least some embodiments, a routing update filter configuration, such as example configuration 500 or example configuration 600, can be dynamically generated based on a description of a topology of a network. Such dynamic generation can be performed by a configuration generation system configured to analyze the description of the network topology, generate a routing update filter configuration based on the description of the topology, and transmit the routing update filter configuration to a router in the network for processing.

A router in the network that is connected to multiple TOR routers can be identified using the description of the topology. For example, using information contained within the description of the topology, it can be determined that a given node is a router and that multiple other nodes connected to the router are TOR routers. Based on this information, a routing update filter can be generated that, when processed by the router, will cause the router to prevent routing updates (e.g., link state update messages) from being transmitted from one of the multiple TOR routers to another of the multiple TOR routers. In at least some embodiments, the description of the topology can be used to identify non-TOR routers in the network and the generated configuration can permit routing updates from the non-TOR routers and deny routing updates from all other sources (including any TOR routers).

Figure 7:
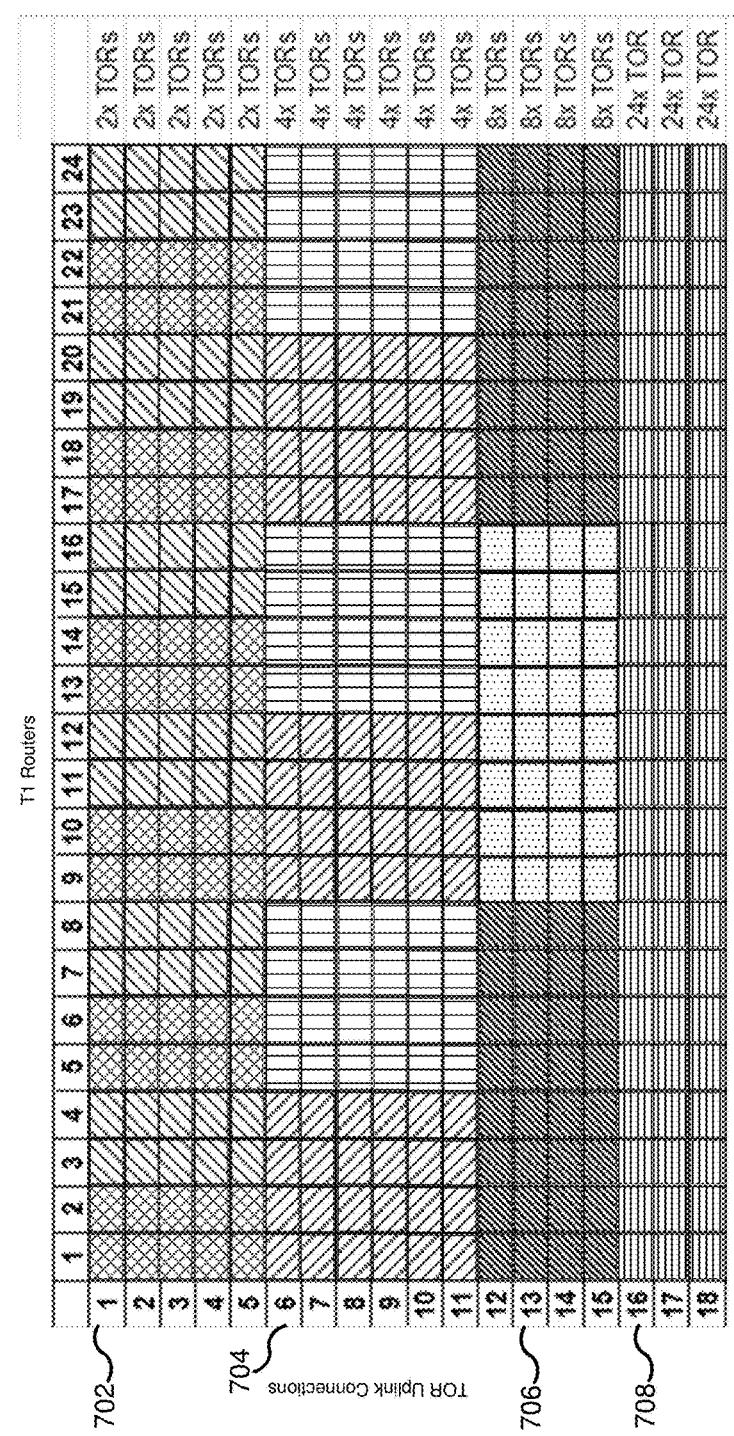
FIG. 7 is a diagram depicting example TOR uplink connections with a power-of-two uplink restriction.

FIG. 7 is a diagram depicting example TOR uplink connections 700 with a power-of-two uplink restriction. This example diagram depicts uplink connections from various TOR routers to 24 T1 routers in a rack aggregation device. Columns 1-24 represent T1 routers, each with 18 uplink interfaces. Connections of the TOR routers to the uplink interfaces of the T1 routers are represented by cells with different line patterns, wherein each sequence of cells with a same pattern represent uplink connections for a TOR router. Row 702 represents 12 TOR routers, each with uplink connections to 2 of the T1 routers. Row 704 represents 6 TOR routers, each with uplink connections to 4 of the T1 routers. Row 706 represents 3 TOR routers, each with uplink connections to 8 of the T1 routers. Row 708 represents 1 TOR router with uplink connections to all 24 of the T1 routers.

Organizing the uplink connections for the various TOR routers according to the power-of-two restriction ensures that the connections for any two TOR routers either completely overlap or do not overlap at all (it is acceptable for a TOR router with fewer connections to overlap with a TOR router with more connections, so long as the TOR router with fewer connections is not connected to a T1 router to which the TOR router with more connections is not connected). However, the power-of-two restriction forces a TOR router, in this example, to have either 2, 4, 8, or 24 uplinks. Any other number of uplink connections would break the guarantee that any two TOR routers either completely overlap or do not overlap at all.

Figure 8:
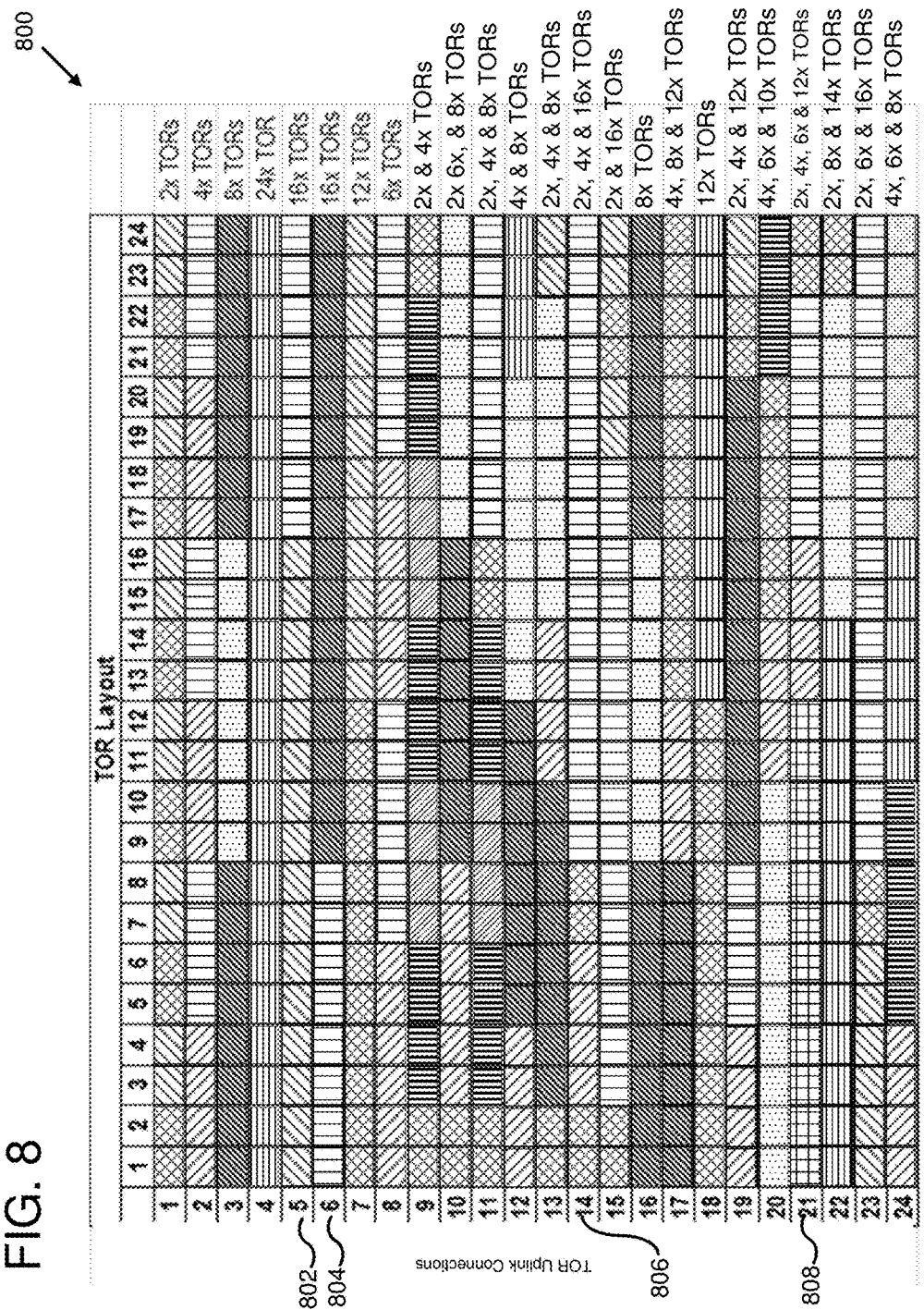
FIG. 8 is a diagram depicting example TOR uplink connections without uplink restrictions.

Using technologies described herein, it is no longer necessary to avoid partially overlapping TOR router uplink connections. The number of uplink connections a TOR router has can be dictated by application requirements instead of uplink placement restrictions. FIG. 8 is a diagram depicting example top-of-rack uplink connections 800 without a power-of-two restriction. Uplink connections from various TOR routers to 24 T1 routers in a rack aggregation device are depicted. Columns 1-24 represent T1 routers, each with 24 uplink interfaces.

Connections of the TOR routers to the uplink interfaces of the T1 routers are represented by cells with different line patterns, wherein each sequence of cells with a same patter represent uplink connections for a TOR router. Rows 802-804 represent 3 TOR routers, each with uplink connections to 16 T1 routers. Row 806 represents two TOR routers, each with uplink connections to 2 of the T1 routers, a TOR router with uplink connections to 4 of the T1 routers, and a TOR router with uplink connections to 16 of the T1 routers. Row 808 represents a TOR router with uplink connections to 12 of the T1 routers, a TOR router with uplink connections to 4 of the T1 routers, a TOR router with uplink connections to 6 of the T1 routers, and a TOR router with uplink connections to 2 of the T1 routers.

In any of the examples described herein, some link updates can be transmitted to a TOR router, while other link updates are blocked based on certain criteria. For example, a router in a higher tier of a network can be configured to determine whether a source TOR router for a given link state update fully overlaps or partially overlaps with a destination TOR router. If the TOR routers fully overlap, the router in the higher tier of the network can allow the link state update can be transmitted to the destination TOR router. However, if the TOR routers partially overlap, the router in the higher tier can block the link state update from being transmitted to the destination TOR router.

In a further or different embodiment, the decision to apply a link state update filter at a router in a higher tier of a network can be based on requirements for particular communications between two or more TOR routers. For example, a high volume data flow from one TOR router to another TOR router may perform better, in some cases, using a subset of a transmitting TOR router's available uplink connections that overlap with a subset of a receiving TOR router's uplink connections, instead of using all of the transmitting TOR router's uplink connections. In such a case, the router in the higher tier of the network can allow link state updates for the two TOR routers to be transmitted to one another so that the overlapping connections will be detected by the TOR routers and used exclusively for the high volume data flow.

Figure 9:
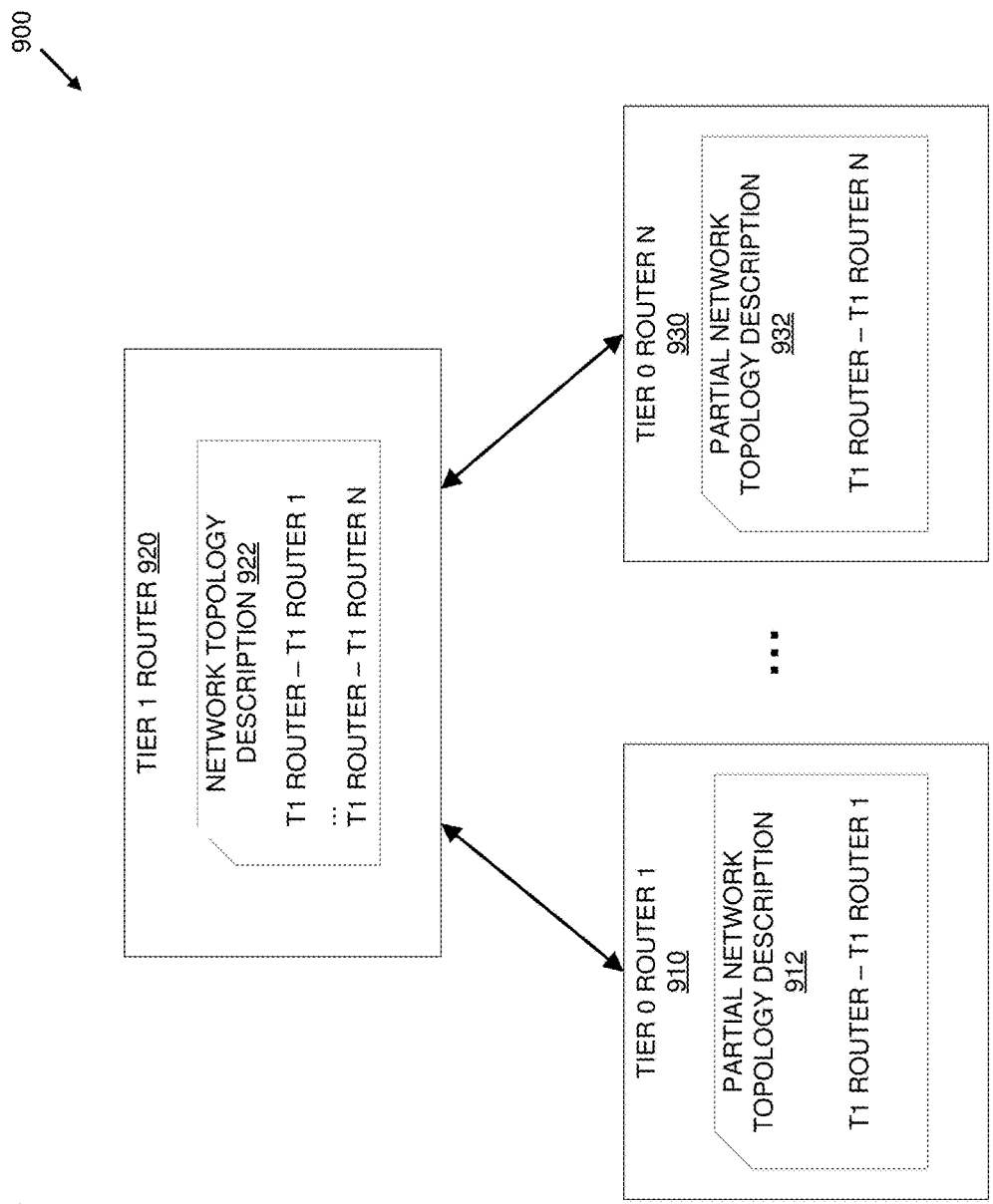
FIG. 9 is a system diagram depicting an example system comprising a tier 1 router with a network topology description and multiple tier 0 routers with partial network topology descriptions in a multi-tire network.

FIG. 9 is a system diagram depicting an example system 900 comprising a tier 1 router 920 comprising a network topology description 922, and multiple tier 0 routers 910-930 comprising partial network topology descriptions 912-932, in a multi-tier network. In at least one embodiment to tier 0 routers 910-930 are top-of-rack routers.

The tier 1 router 920 can comprise multiple interfaces to which tier 0 routers 910-930 are connected. In at least one embodiment, the tier 0 routers 910-930 are connected to different numbers of the multiple interfaces of the tier 1 router 920. The network topology description 922 includes descriptions of the connections between the tier 1 router 920 and the tier 0 routers 910-930.

The multiple tier 0 routers 910-930 comprise different partial network topology descriptions 912-932. The tier 0 router 910 comprises the partial network topology description 912 that includes the connection between the tier 0 router 910 and the tier 1 router 920, but does not include the connection between the tier 0 router 930 and the tier 1 router 920. Similarly, the tier 0 router 930 comprises a partial network topology description 932 that includes the connection between the tier 0 router 930 and the tier 1 router 920, but does not include the connection between the tier 0 router 910 and tier 1 router 920. The network topology description 922 and the partial network topology descriptions 912-932 can be defined by routing tables and/or LSDBs stored in the tier 1 router 920 and the tier 0 routers 910-930.

In at least one embodiment, the tier 1 router 920 is configured to cause the tier 0 routers 910-930 to generate the partial network topology descriptions 912-932, respectively, by preventing routing updates originating from the tier 0 routers 910-930 from being transmitted to one another. The tier 1 router 920 can be configured to prevent routing updates from being transmitted to the tier 0 routers 910-930 by a routing filter configuration (not shown), such as the routing update filter configuration 122 depicted in FIG. 1.

The tier 0 routers 910-930 can be configured to use the partial network topology descriptions 912-932 when determining routing paths for data to be transmitted in the multi-tier network. Based on the partial network topology description 912, the tier 0 router 910 will not detect the direct connection between the tier 0 router 930 and tier 1 router 920, to which the tier 0 router 910 is also directly connected. As a result, the tier 0 router 910 will not transmit data destined for the tier 0 router 930 exclusively through the tier 1 router 920. Similarly, the tier 0 router 930, using the partial network topology description 932, will not detect the direct connection between the tier 0 router 910 and the tier 1 router 920. As a result, the tier 0 router 930 will not transmit data destined for the tier 0 router 910 exclusively through the tier 1 router 920.

Figure 10:
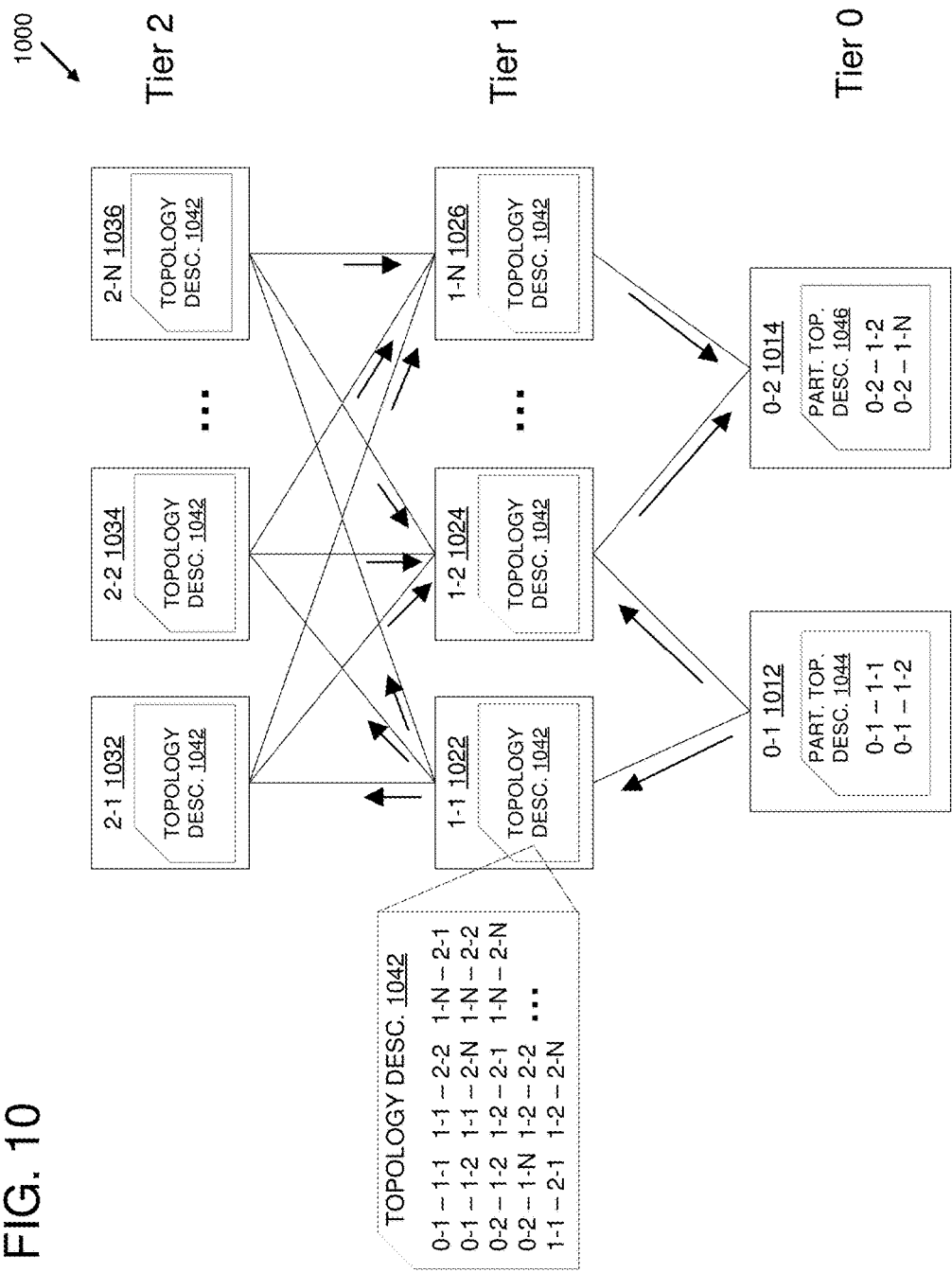
FIG. 10 is a system diagram depicting an example system comprising multiple tier 1 and tier 2 routers comprising a same topology description and two tier 0 routers with partial topology descriptions in a multi-tier network.

FIG. 10 as a system diagram depicting an example system 1000 comprising a multi-tier network comprising multiple tier 1 routers 1022-1026 and multiple tier 2 routers 1032-1036 comprising a network topology description 1042. The multi-tier network further comprises two tier 0 routers 1012 and 1014 comprising partial topology descriptions 1044 and 1046, respectively. The topology description 1042 comprises descriptions of all connections between the routers in the multi-tier network. Whereas, a partial topology description (e.g., 1044 or 1046) comprises descriptions for less than all of the connections between the routers and the multi-tier network.

The topology description 1042 can be used by the tier 1 routers 1022-1026 and the tier 2 routers 1032-1036 to determine networking routes for the transmission of data messages in the multi-tier network. In at least one embodiment, the topology description 1042 can be generated at each of the tier 1 routers 1022-1026 and the tier 2 routers 1032-1036 independently based on network routing update messages transmitted between the routers in the multi-tier network. In a different or further embodiment, the topology description 1042 is stored in a separate routing table and/or LSDB in each of the tier 1 routers 1022-1026 and the tier 2 routers 1032-1036.

The partial topology description 1044 can be used by the tier 0 router 1012 to determine networking routes for the transmission of data messages from the tier 0 router 1012 to other routers in the multi-tier network. The partial topology description 1044 omits at least one connection between the tier 0 router 1014 and a tier 1 router in the multi-tier network, such as the connection between the tier 0 router 1014 and the tier 1 router 1024. In at least one embodiment, the partial topology description 1044 omits connections involving all other tier 0 routers in the multi-tier network. In a different or further embodiment, the partial topology descriptions 1044 and 1046 are stored in routing tables and/or LSDBs of the tier 0 routers 1012 and 1014, respectively.

The partial topology description 1044 can be generated, at least in part, by preventing network routing updates originating from one or more other tier 0 routers from being transmitted to the tier 0 router 1012. For example, the tier 1 routers 1022-1024 (to which the tier 0 router 1012 is directly connected), upon receipt of network routing updates originating from the tier 0 router 1014, can prevent the received routing updates from being transmitted to the tier 0 router 1012. In such an embodiment, the tier 0 router 1012 can be configured to determine, due to the absence of a description of the direct connection between the tier 1 router 1024 and the tier 0 router 1014, that the connection between the tier 0 router 1012 and the tier 1 router 1022 (which is not directly connected to the tier 0 router 1014) has a same cost for transmitting a data message from the tier 0 router 1012 to the tier 0 router 1014 as the connection between the tier 0 router 1012 and the tier 1 router 1024. Responsive to determining that the connections between the tier 0 router 1012 and the tier 1 routers 1022 and 1024 have the same cost for transmitting the data message to the tier 0 router 1014, the tier 0 router 1012 can use transmit part of the data message to the tier 1 router 1022 for routing to the tier 0 router 1014 (e.g., by using a technique for transmitting different parts of the data message to different routers, such as ECMP).

The arrows depicted in FIG. 10 illustrate an example route that the data message from tier 0 router 1012 can take through the network to arrive at the tier 0 router 1014. The tier 0 router 1012, based on the partial topology description 1044, can transmit part of the data message to the tier 1 router 1022 and can transmit another part of the data message to the tier 1 router 1024. Upon receipt of the part of the data message, the tier 1 router 1022 can use the topology description 1042 to identify one or more potential routes in the network for routing the part of the data message to the tier 0 router 1014. Since the topology description 1042 comprises a full list of the connections between the routers and the multi-tier network, the tier 1 router 1022 can identify potential routes from the tier 1 router 1022 to the tier 0 router 1014 that include one or more of the tier 2 routers 1032-1036. The tier 1 router 1022 can then transmit all or part of the received part of the data message to the one or more identified tier 2 routers 1032-1036.

Upon receipt of data from the tier 1 router 1022, the one or more tier 2 routers 1032-1036, using the topology description 1042, can identify routes to the tier 0 router 1014 through one or more of the tier 1 routers 1024-1026. The tier 2 routers 1032-1036 can then transmit all or part of the received data to one or more of the tier 1 routers 1024-1026. Upon receipt of the data from the tier 2 routers 1032-1036, the one or more of the tier 1 routers 1024-1026, using the topology description 1042, can identify the direct connections from the tier 1 routers 1014-1026 to the tier 0 router 1014 and then transmit the received data to the tier 0 router 1014 via the identified direct connections.

The tier 1 router 1024 can also receive the another part of the data message from the tier 0 router 1012 by the direct connection from the tier 0 router 1012 to the tier 1 router 1024. In at least one embodiment, the tier 1 router 1024 is configured to detect the direct connection from the tier 1 router 1024 to the tier 0 router 1014 and to transmit the received another part of the data message to the tier 0 router 1014 over the direct connection.

The partial topology description 1046 of the tier 0 router 1014 omits at least one direct connection between the tier 0 router 1012 and a tier 1 router, such as the direct connection between the tier 1 router 1024 and the tier 0 router 1012. The partial topology description 1046 can be generated, at least in part, by configuring the tier 1 routers directly connected to the tier 0 router 1014 (e.g., 1024-1026) to block at least some of the routing updates originating from the tier 0 router 1012 from being transmitted to the tier 0 router 1014. In an embodiment where the partial topology description 1046 omits the direct connection between the tier 1 router 1024 and the tier 0 router 1012, tier 0 router 1014 will not detect the shared direct connection between the tier 0 routers 1012 and 1014 and the tier 1 router 1024 and, thus, will not transmit data messages destined for the tier 0 router 1012 exclusively through the tier 1 router 1024.

In at least some embodiments, the partial topology description's 1044 and 1046 can include connections between the tier 1 routers 1022-1026 and the tier 2 routers 1032-1036. For example, the tier 1 routers 1022-1026 can be configured to block routing updates originating from tier 0 routers from being transmitted to other tier 0 routers, but to allow routing updates originating from routers in higher tiers of the network to be transmitted to the tier 0 routers. In such an embodiment, a partial topology description of a tier 0 router, such as 1044 or 1046, can describe all of the connections between the routers in higher tiers of the network but not the connections between the tier 1 routers 1012-1026 and any other tier 0 routers.

Figure 11:
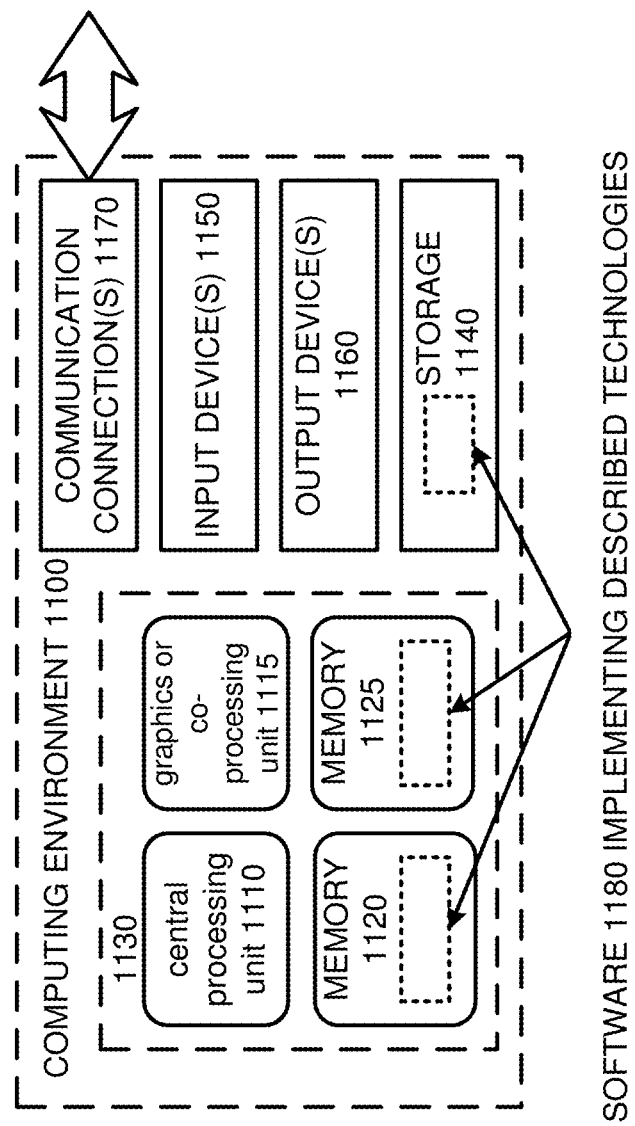
FIG. 11 depicts a generalized example of a suitable computing environment in which the described innovations may be implemented.

FIG. 11 depicts a generalized example of a suitable computing environment 1100 in which the described innovations may be implemented. The computing environment 1100 is not intended to suggest any limitation as to scope of use or functionality, as the innovations may be implemented in diverse general-purpose or special-purpose computing systems. For example, the computing environment 1100 can be any of a variety of computing devices (e.g., network router, network switch, desktop computer, laptop computer, server computer, tablet computer, etc.).

With reference to FIG. 11, the computing environment 1100 includes one or more processing units 1110, 1115 and memory 1120, 1125. In FIG. 11, this basic configuration 1130 is included within a dashed line. The processing units 1110, 1115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 11 shows a central processing unit 1110 as well as a graphics processing unit or co-processing unit 1115. The tangible memory 1120, 1125 may be volatile memory (e.g., registers, cache, RAM), non-volatile memory (e.g., ROM, EEPROM, flash memory, etc.), or some combination of the two, accessible by the processing unit(s). The memory 1120, 1125 stores software 1180 implementing one or more innovations described herein, in the form of computer-executable instructions suitable for execution by the processing unit(s).

A computing system may have additional features. For example, the computing environment 1100 includes storage 1140, one or more input devices 1150, one or more output devices 1160, and one or more communication connections 1170. An interconnection mechanism (not shown) such as a bus, controller, or network interconnects the components of the computing environment 1100. Typically, operating system software (not shown) provides an operating environment for other software executing in the computing environment 1100, and coordinates activities of the components of the computing environment 1100.

The tangible storage 1140 may be removable or non-removable, and includes magnetic disks, magnetic tapes or cassettes, CD-ROMs, DVDs, or any other medium which can be used to store information in a non-transitory way and which can be accessed within the computing environment 1100. The storage 1140 stores instructions for the software 1180 implementing one or more innovations described herein.

The input device(s) 1150 may be a touch input device such as a keyboard, mouse, pen, or trackball, a voice input device, a scanning device, or another device that provides input to the computing environment 1100. The output device(s) 1160 may be a display, printer, speaker, CD-writer, or another device that provides output from the computing environment 1100.

The communication connection(s) 1170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers. A computer-readable storage medium can be a storage device, as described herein.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope of these claims.

What is claimed is:

1. A system, comprising:
   in a multi-tier computer network, multiple top-of-rack routers configured to:
      transmit link state advertisement packets to a router in a higher tier of the multi-tier network, and
      receive link state advertisement packets from the router in the higher tier of the multi-tier network; and
   the router in the higher tier of the multi-tier network configured to:
      determine that one of the multiple top-of-rack routers is not a router from which link state advertisement packets are allowed; and
      responsive to the determining, block link state advertisement packets received from the one of the multiple top-of-rack routers from being transmitted to another of the multiple top-of-rack routers.

2. The system of claim 1, wherein:
   the router in the higher tier of the multi-tier network is further configured to store a link state advertisement filter identifying routers from which link state advertisement packets are allowed; and
   wherein the determining that the one of the multiple top-of-rack routers is not a router from which link state advertisement packets are allowed comprises determining that the one of the multiple top-of-rack routers is identified in the link state advertisement filter.

3. The system of claim 2, wherein the link state advertisement filter is associated with a downlink interface of the router in the higher tier of the multi-tier network that is connected to the another of the multiple top-of-rack routers.

4. The system of claim 2, wherein determining that the one of the multiple top-of-rack routers is not a router from which link state advertisement packets are allowed further comprises:
  identifying a source address of the one of the multiple top-of-rack routers in the received link state advertisement packet; and
  determining that the source address of the one of the multiple top-of-rack routers is not included in a list of authorized addresses defined in the link state advertisement filter.

5. A method, comprising:
  receiving a routing update at a router in a second tier of a multi-tier network from a router in a first tier of the multi-tier network, wherein the first tier is a lower tier in the multi-tier network than the second tier;
  determining, by the router in the second tier of the multi-tier network, that routing updates from the router in the first tier of the multi-tier network are not allowed; and
  responsive to the determining that the router in the first tier of the multi-tier network is a router from which routing updates are not allowed, blocking the routing update received from the router in the first tier of the network from being transmitted to another router in the first tier of the network.

6. The method of claim 5, further comprising:
  identifying the router in the second tier of the network in a network topology;
  identifying the routers in the first tier of the network in the network topology;
  generating a routing update filter configuration that, when processed by the router in the second tier of the network, causes the router in the second tier of the network to determine that the routing updates are not allowed from the router in the first tier of the multi-tier network and to block the routing update received from the router in the first tier of the network from being transmitted to the another router in the first tier of the network; and
  transmitting the generated routing update filter configuration to the router in the second tier of the network for processing.

7. The method of claim 6, further comprising:
  processing the routing update filter configuration by the router in the second tier of the network to create a routing update filter; and
  applying the routing update filter to one or more downlink interfaces of the router in the second tier of the network according to the configuration.

8. The method of claim 5, further comprising:
  determining whether the routers in the first tier of the network have partially overlapping uplink connections; and
  blocking the routing update from being transmitted to the another router in the first tier of the network only if the routers in the first tier of the network have partially overlapping uplink connections.

9. The method of claim 5, wherein the routers in the first tier of the network are top-of-rack routers.

10. The method of claim 5, wherein the router in the first tier is a first router in the first tier, the another router in the first tier is a second router in the first tier, and the method further comprises:
  generating, at the second router in the first tier, based at least in part on not receiving the blocked routing update, a representation of a topology of the network that does not include a direct connection between the first router in the first tier and the router in the second tier.

11. The method of claim 10, further comprising:
  using the generated representation of the network topology to determine a networking route for transmitting a data message from the second router in the first tier to the first router in the first tier.

12. The method of claim 11, wherein determining the network route comprises:
  determining, due to the absence of the direct connection between the first router in the first tier and the router in the second tier from the representation of the network topology, that a connection between the second router in the first tier and the router in the second tier, and a connection between the second router in the first tier and another router in the second tier that is not directly connected to the first router in the first tier, have a same cost for transmitting the data message to the first router in the first tier; and
  responsive to the determining that the connections have the same cost, transmitting at least part of the data message to the another router in the second tier for routing to the first router in the first tier.

13. The method of claim 12, wherein the at least part of the data message transmitted to the another router in the second tier is routed to the first router in the first tier via a router in a third tier of the network connected to both routers in the second tier.

14. The method of claim 12, wherein a part of the data message is transmitted to the first router in the first tier via the direct connection between the router in the second tier and the first router in the first tier.

15. The method of claim 14, wherein another part of the data message is transmitted to the first router in the first tier by a separate router in the second tier that is not directly connected to the second router in the first tier.

16. A system, comprising:
  a router comprising:
    multiple interfaces connected to multiple top-of-rack routers in a multi-tier computer network, and
    a description of a topology of the network that includes the connections between the router and the multiple top-of-rack routers,
  wherein the router is configured to:
    receive routing updates from the multiple top-of-rack routers,
    determine, using the description of the topology of the network, that one of the multiple top-of-rack routers is not a router from which routing updates are allowed, and
    responsive to the determining, prevent routing updates originating from the one of the multiple top-of-rack routers from being transmitted to another of the multiple top-of-rack routers; and
  the multiple top-of-rack routers, wherein the another of the multiple top-of-rack routers is configured to:
    receive routing updates from the router, not including the routing updates originating from the one of the multiple top-of-rack routers, and
    based on the received routing updates, generate a description of the topology of the network that does not include a connection from the one of the multiple top-of-rack routers to the router.

17. The system of claim 16, wherein the router is further configured to prevent the routing updates from being transmitted to the another of the multiple top-of-rack routers by a routing filter configuration.

18. The system of claim 16, wherein the router is further configured to allow routing updates originating from routers in tiers of the multi-tier network that are higher than the top-of-rack routers to be transmitted to the another of the multiple top-of-rack routers.

19. The system of claim 18, wherein:
the routers in tiers of the multi-tier network that are higher than the top-of-rack routers comprise one or more routers in a tier of the multi-tier network that is higher than the router; and
the another of the multiple top-of-rack-routers is further configured to route data packets destined for the one of the multiple top-of-rack servers through one or more of the one or more routers in the tier of the multi-tier network that is higher than the router.

20. The system of claim 16, wherein the one of the multiple top-of-rack routers and the another of the multiple top-of-rack routers are connected to different interfaces of the multiple interfaces of the router.

\* \* \* \* \*

UNITED STATES PATENT AND TRADEMARK OFFICE
CERTIFICATE OF CORRECTION

PATENT NO. : 10,326,685 B1  
APPLICATION NO. : 15/275126  
DATED : June 18, 2019  
INVENTOR(S) : Colin John Whittaker Page 1 of 1

It is certified that error appears in the above-identified patent and that said Letters Patent is hereby corrected as shown below:

On the Title Page

<u>In the Abstract,</u>
Line 8, "routers the" should read -- routers in the --.

Signed and Sealed this  
Thirteenth Day of September, 2022

Katherine Kelly Vidal  
*Director of the United States Patent and Trademark Office*